(12) United States Patent
Kazakov et al.

(10) Patent No.: US 7,696,281 B2
(45) Date of Patent: *Apr. 13, 2010

(54) POLYOLEFIN BLENDS AND PIPE

(75) Inventors: Alexei Kazakov, Calgary (CA); Gary Yim, Calgary (CA)

(73) Assignee: NOVA Chemicals (International) S.A. (CH)

( * ) Notice: Subject to any disclaimer, the term of this patent is extended or adjusted under 35 U.S.C. 154(b) by 313 days.

This patent is subject to a terminal disclaimer.

(21) Appl. No.: 11/985,217

(22) Filed: Nov. 14, 2007

(65) Prior Publication Data

US 2008/0090040 A1    Apr. 17, 2008

Related U.S. Application Data

(63) Continuation of application No. 10/858,194, filed on Jun. 1, 2004, now Pat. No. 7,309,741.

(51) Int. Cl.
    C08L 23/04    (2006.01)
(52) U.S. Cl. .................................. 525/240
(58) Field of Classification Search ................. 525/240
    See application file for complete search history.

(56) References Cited

U.S. PATENT DOCUMENTS

| | | | | |
|---|---|---|---|---|
| 4,543,399 A | 9/1985 | Jenkins, III et al. | ........... | 526/70 |
| 4,588,790 A | 5/1986 | Jenkins, III et al. | ........... | 526/70 |
| 5,132,380 A | 7/1992 | Stevens et al. | ............. | 526/126 |
| 5,198,401 A | 3/1993 | Turner et al. | ................ | 502/155 |
| 5,306,775 A | 4/1994 | Martin et al. | ................ | 525/240 |
| 5,352,749 A | 10/1994 | DeChellis et al. | ............. | 526/68 |
| 5,434,116 A | 7/1995 | Sone et al. | ................... | 502/103 |
| 5,436,304 A | 7/1995 | Griffin et al. | .................. | 526/68 |
| 5,554,775 A | 9/1996 | Krishnamurti et al. | ......... | 556/7 |
| 5,637,659 A | 6/1997 | Krishnamurti et al. | ...... | 526/133 |
| 6,080,828 A * | 6/2000 | Kojoh et al. | ................. | 526/352 |
| 6,234,950 B1 | 5/2001 | von Haken Spence et al. | ........................... | 502/155 |
| 6,245,867 B1 | 6/2001 | Debras | ........................ | 526/65 |
| 6,342,463 B1 | 1/2002 | Stephan et al. | ............... | 502/103 |
| 6,350,814 B1 | 2/2002 | Bauer et al. | .................. | 525/191 |
| 6,440,890 B1 | 8/2002 | von Haken Spence et al. | ........................... | 502/155 |
| 2004/0249083 A1 * | 12/2004 | Maziers | ...................... | 525/240 |

FOREIGN PATENT DOCUMENTS

| | | |
|---|---|---|
| CA | 2078309 | 9/1992 |
| EP | 0659773 | 8/1998 |
| WO | WO 01/05852 | 1/2001 |

OTHER PUBLICATIONS

J.B.Peri and A.L.Hensley, Jr., The Surface Structure of Silica Gel, The Journal of Physical Chemistry, pp. 2926-2933, 1968.
Grant, Grant and Hackhs Chemical Dictionary, p. 134 (1987).

* cited by examiner

Primary Examiner—Jeffrey C Mullis
(74) Attorney, Agent, or Firm—Kenneth H Johnson

(57) ABSTRACT

A polyolefin blend comprising:
(a) from 30 to 80 weight % of a low molecular weight copolymer comprising from 85 to 100 weight % of ethylene and from 15 to 0 weight % of one or more $C_{4-8}$ alpha olefins having a density from 0.953 to 0.965 g/cm³ and a melt flow rate (2.16 kg 190° C.) from 0.1 to 20.0 g/10 minutes; and
(b) from 70 to 20 weight % of a high molecular weight copolymer comprising from 85 to 99.9 weight % of ethylene and from 15 to 0.1 weight % of one or more $C_{4-8}$ alpha olefins having a density from 0.915 to 0.940 g/cm³ and a melt flow rate (21.6 kg 190° C.) from 0.05 to 5.0 g/10 minutes, said copolymer being prepared with a single site catalyst is useful in the preparation of pipe.

8 Claims, No Drawings

POLYOLEFIN BLENDS AND PIPE

This is a continuation of Ser. No. 10/858,194, filed on Jun. 1, 2004 now U.S. Pat. No. 7,309,741.

FIELD OF THE INVENTION

The present invention relates to polyolefin, preferably polyethylene, blends and particularly to a blend of a low molecular weight high density ethylene polymer made using a chrome based catalyst or a Ziegler Natta type and a high molecular weight lower density polyethylene made using a group 4 single site type catalyst. The blends are suitable for use in the manufacture of pipes.

BACKGROUND OF THE INVENTION

There are a large number of patents relating to blends of polyolefins and particularly blends of low density polyethylene and a high density polyethylene.

U.S. Pat. No. 5,306,775 issued Apr. 26, 1994 to Martin et al., assigned to Phillips Petroleum Company discloses a blend of comprising from 70 to 30 weight % of a low molecular weight ethylene homopolymer having a density greater than 0.960 g/cm³ and melt index (2.16 kg, 190° C.) greater than 30 gm per 10 minutes made in the presence of a chromium catalyst and from 30 to 70 weight % of a high molecular weight ethylene copolymer having a density less than 0.955 g/cm³ and a high load melt index (21.6 kg 190° C.) from 0.1 to 50 g/10 minutes made in the presence of a titanium chloride based catalyst system. The reference teaches away from the present invention in that the chrome catalyst component is a homopolymer having a higher density and a significantly higher melt index than those of the present invention.

WO 2001/005852 filed Jul. 15, 1999 in the name of Van Dun, Jozef et al., assigned to Dow Global Technologies Inc. discloses a polymer blend composition comprising; (A) an ethylene homopolymer in an amount of from 1 to 99 percent by weight based on the combined weight of components (A) and (B), having a ratio of Mw/Mn (polydispersity) (as measured by GPC) greater than about 2.5, a density which satisfies the following inequality; density (g/cm³)>0.9611+ 0.0058 log I₂−0.00128] log² I₂; and an Mw/Mn ratio which satisfies the following inequality; Mw/Mn≦11.67 log [Mw− 43.67;] and (B) an ethylene homopolymer other than one of component A having the identical properties or an ethylene alpha olefin copolymer in an amount of from 1 to 99 percent by weight based on the combined weight of components (A) and (B). The reference teaches away from the present invention in that two homopolymers are not present and no component in the present invention has a density greater than 0.960 g/cm³.

U.S. Pat. No. 6,350,814 issued Feb. 26, 2002 to Bauer et al., assigned to Basell Polyolefine GmbH teaches a blend of a polyethylene made using a metallocene catalyst and a polyethylene made using a Ziegler Natta or Phillips catalyst. The polyethylene made using the metallocene catalyst has a density from 0.91 to 0.93 g cm³ and the polyethylene made using the Ziegler Natta or Phillips catalyst has a density from 0.930 to 0.945 g/cm³. There is no component in the blend having a density greater than 0.953 g/cm³.

U.S. Pat. No. 6,245,867 issued Jun. 12, 2001 to Debras, assigned to Fina Research S.A. teaches a process to prepare a blend of polyethylenes made using tandem or sequential reactors. An ethylene homopolymer is made using the chrome based catalyst and an ethylene homopolymer or copolymer is made in the second reactor using either a Ziegler Natta catalyst or a metallocene catalyst. The polymers are not broadly described in the specification. However, the examples give some of the properties of the different components. The ethylene homopolymer made with the chrome based catalyst has a density from 0.964 g/cc this is greater than the density for the ethylene polymer of the present invention made using a chrome catalyst. The density of the ethylene copolymer made using the Ziegler Natta catalyst is above 0.940 g/cc which is greater than the density for the ethylene copolymer of the present invention made using a metallocene catalyst. The reference teaches away from the subject matter of the present invention.

Canadian Patent application 2,078,309 laid open Mar. 19, 1993 in the name of Martin et al., assigned to Phillips Petroleum Company teaches a polyethylene blend comprising less than or equal to 35 weight % of a high molecular weight polyethylene prepared in the presence of a Ziegler Natta titanium based catalyst having a HLMI from 0.2 to 25 g/10 minutes, a density from 0.910 to 0.940 g/cc and a polydispersity less than about 10 and greater than 65 weight % of a low molecular weight polyethylene prepared in the presence of a chrome based catalyst having a density from 0.945 g/cc to 0.980 g/cc, a melt index from 0.1 to 5 g/10 minutes and a polydispersity greater than or equal to about 6.

The present patent application seeks to provide a blend of a higher density low molecular weight polyethylene prepared in the presence of the chromium or a Ziegler Natta type catalyst and a lower density higher molecular weight polyethylene prepared in the presence of a single site type catalyst.

SUMMARY OF THE INVENTION

The present invention provides a polyolefin blend comprising:

(a) from 30 to 80, preferably from 40 to 70, most preferably from 40 to 60 weight % of a low molecular weight polymer comprising from 85 to 100, preferably from 90 to 99.95 weight % of ethylene and from 15 to 0, preferably from 10 to 0.05 weight % of one or more C₄₋₈ alpha olefins having a density from 0.953 to 0.965 g/cm³ and a melt flow rate (2.16 kg 190° C.) from 0.1 to 20, preferably from 0.5 to 10.0, most preferably from 0.5 to 2 g/10 minutes prepared in the absence of a metallocene or single site catalyst; and (b) from 70 to 20, preferably from 60 to 30, most preferably from 60 to 40 weight % of a high molecular weight copolymer comprising from 85 to 99.9, preferably from 90 to 99.9 weight % of ethylene and from 15 to 0.1, preferably from 10 to 0.1 weight % of one or more C₄₋₈ alpha olefins having a density from 0.915 to 0.940, preferably from 0.922 to 0.935 g/cm³ and a melt flow rate (21.6 kg 190° C.) from 0.05 to 5.0, preferably from 0.05 to 1 g/10 minutes, said copolymer being prepared with catalyst comprising a group 4 metal of the formula:

$$(L)_n\text{-M-}(X)_p$$

wherein M is a group 4 metal; L is a monoanionic ligand selected from the group consisting of a cyclopentadienyl-type ligand, a bulky heteroatom ligand and a phosphinimine ligand; X is an activatable ligand; n may be from 1 to 3; and p may be from 1 to 3, provided that the sum of n+p equals the valence state of M, and further provided that two L ligands may be bridged by a silyl radical or a C₁₋₄ alkyl radical and an activator.

DETAILED DESCRIPTION

As used in this specification the following words or phrases have the following meanings:

Polydispersity is the ratio of the weight average molecular weight (as determined by GPC) to the number average molecular weight (as determined by GPC) (i.e. Mw/Mn) to any component in the blend or the blend per se.

The term "cyclopentadienyl" refers to a 5-member carbon ring having delocalized bonding within the ring and typically being bound to the active catalyst site, generally a group 4 metal (M) through covalent $\eta^5$-bonds.

The term short chain branching means the branches having less than 8 carbon atoms. This is determined by Nuclear Magnetic Resonance (NMR) and typically is determined as the number of branches per 1000 carbon atoms in the polymer backbone.

The term "scavenger" as used in this specification is meant to include those compounds effective for removing polar impurities from the reaction solvent. Such impurities can be inadvertently introduced with any of the polymerization reaction components, particularly with solvent, monomer and catalyst feed; and have, an adverse effect on catalyst activity and stability. The presence of impurities can result in a decrease or elimination of catalytic activity, particularly when an activator capable of ionizing the group 4 metal complex is also present.

Melt flow rate means the number of grams of polymer extruded during 10 minutes under a load at a temperature of 190° C. in accordance with the procedure set out in ASTM D 1238-94a. The melt flow rate is sometimes called High Load Melt Index if a load of 21.6 kg is used, or called Melt Index if a load of 2.16 kg is used.

Density means the density as determined in accordance with ASTM D 1928.

The blends of the present invention comprise a high density low molecular weight polyethylene and a low density high molecular weight polyethylene.

The polyethylenes useful in accordance with the present invention generally comprise from 85 to 100 weight % of ethylene and the balance one or more $C_{4-8}$ alpha olefins. Typically the higher density lower molecular weight polymer will comprise from 85 to 100, preferably from 85 to 99.95, most preferably from 90 to 99.95 weight % of ethylene and from 15 to 0, preferably from 15 to 0.05, most preferably from 10 to 0.05 weight % of one or more $C_{4-8}$ alpha olefins. The lower density high molecular weight polymer will typically comprise from 85 to 99.9, preferably from 90 to 99.9 weight % of ethylene and from 15 to 0.1, preferably from 10 to 0.1 weight % of one or more $C_{4-8}$ alpha olefins. Suitable $C_{4-8}$ alpha olefins include butene, hexene and octene.

The high density low molecular weight polyethylene may be used in amounts from 30 to 80, preferably from 40 to 70, most preferably from to 40 to 60 weight % and the low density high molecular weight polyethylene may be used in the blend correspondingly in amounts from 70 to 20, preferably 60 to 30, most preferably from 60 to 40 weight %.

The high density low molecular weight polyethylene may be made using any process or platform (e.g. solution, slurry or gas phase polymerization as described below) and a catalyst which is not a metallocene catalyst or a single site catalyst (e.g. a Ziegler Natta type catalyst or a chrome based catalyst).

The catalyst may be a Ziegler Natta type catalyst. Generally the Ziegler Natta type catalysts comprise a titanium compound and a reducing agent typically an aluminum compound. There are many variations in the composition of Ziegler Natta catalysts. Further optional components vanadium compounds such as vanadium oxy halides (e.g. $VOCl_3$) magnesium compounds such as magnesium halides and magnesium alkyl halides $R_aMgX_b$ where the sum of a and b is 2, halide donors typically organic compounds such as lower alkyl halides or sequi halides (e.g. t-butyl chloride) to precipitate the magnesium compound as a halide ($MgCl_2$) electron donors such as $C_{3-10}$ esters and ethers such as tetrohydrofuran and optionally a support (as described below). The resulting catalyst is typically activated with an activator which is generally an aluminum alkyl or alkoxy compound in which the alky or alkoxy groups have from 1 to 8 carbon atoms (e.g. triethyl aluminum sometimes referred to as TEAL) and hydrides (e.g. diethyl aluminum hydride) and halides thereof (e.g. diethyl aluminum chloride sometimes referred to as DEAC). The aluminum activator compound may be a polymeric compound such as aluminoxane.

In one embodiment of the invention the high density low molecular weight polyethylene is made in the presence of a chrome based catalyst. Typically the chrome based catalyst is used on a particulate support. Generally the support for the catalyst comprises an inorganic substrate usually of alumina or silica having a pendant reactive moiety. The reactive moiety may be a siloxy radical or more typically is a hydroxyl radical. The preferred support is silica. The support should have an average particle size from about 10 to 150 microns, preferably from about 20 to 100 microns. The support should have a large surface area typically greater than about 100 $m^2/g$, preferably greater than about 250 $m^2/g$, most preferably from 300 $m^2/g$ to 1,000 $M^2/g$. The support will be porous and will have a pore volume from about 0.3 to 5.0 ml/g, typically from 0.5 to 3.0 ml/g. Supports which are specifically designed to be an agglomeration of sub-particles while useful, are not required.

It is important that the support be dried prior to use. Generally the support may be heated at a temperature of at least 200° C. for up to 24 hours, typically at a temperature from 500° C. to 800° C. for about 2 to 20 hours. The resulting support will be free of adsorbed water and should have a surface hydroxyl content from about 0.1 to 5 mmol/g of support, preferably from 0.5 to 3 mmol/g.

A silica suitable for use in the present invention having a high surface area, is amorphous silica (surface area of 300 $m^2/g$; pore volume of 1.65 $cm^3$ per gram). For example, commercially available silicas are marketed under the tradename of Davison® 958 and Davison® 955 by the Davison Chemical Division of W. R. Grace and Company.

The amount of the hydroxyl groups in silica may be determined according to the method disclosed by J. B. Peri and A. L. Hensley, Jr., in J. Phys. Chem., 72 (8), 2926 (1968), the entire contents of which are incorporated herein by reference.

The active catalyst species in the chrome catalyst is hexavalent chromium. Typically a chromium compound which is convertable to hexavalent chromium (e.g. $CrO_3$) is dissolved or dispersed in a liquid medium and the support is impregnated with the compound. Exemplary of such chromium compounds are tert-butyl chromate, chromium acetylacetonate and the like. The chromium compound may also include a silyl chromate of the formula $(R^{10})_3Si\text{—}O\text{—}CrO_2\text{—}O\text{—}Si(R^{10})_3$ wherein $R^{10}$ is selected from the group consisting of $C_{1-10}$, preferably $C_{1-6}$, most preferably $C_{1-4}$ alkyl groups.

Typically the chromium compound is dissolved or suspended in an organic medium such as an inert $C_{5-10}$ hydrocarbon which may be unsubstituted or is substituted by a $C_{1-4}$ alkyl radical. Some solvents include pentane, hexane, heptane, octane, cyclohexane, methyl cyclohexane, hydrogenated naphtha and ISOPAR®E (a solvent available from Exxon Chemical Company) and mixtures thereof.

After impregnation of the support the catalyst is calcined. Calcination can take place by heating in the presence of molecular oxygen at a temperature within the range of 700° to 2000° F. (371° to 1093° C.), preferably 900° to 1700° F. (482° to 927° C.) for about ½ hour to 50 hours, more preferably 2-10 hours. At least a substantial portion of the chromium in low valence stage is converted to the hexavalent form.

Generally the high density low molecular weight polyethylene will have a density from 0.953 to 0.965, preferably from 0.955 to 0.965 g/cc and a melt flow rate (2.16 kg) from 0.1 to 20, preferably from 0.5 to 10.0, most preferably 0.5 to 2 g/10 minutes. The high density low molecular weight polyethylene may have a weight average molecular weight greater than 25,000, typically from 30,000 to 140,000, preferably from about 30,000 to about 100,000, most preferably from about 30,000 to 75,000 as determined by GPC. The high density low molecular weight polyethylene may have a polydispersity (Mw/Mn) greater than about 5, typically from 7 to 20, preferably from about 9 to 16.

The high density low molecular weight polyethylene may be produced using any convenient process, typically by gas phase or slurry polymerization.

Fluidized bed gas phase reactors to make polyethylene are generally operated at low temperatures from about 50° C. up to about 120° C. (provided the sticking temperature of the polymer is not exceeded) preferably from about 75° C. to about 110° C. and at pressures typically not exceeding 3,447 kPa (about 500 psi) preferably not greater than about 2,414 kPa (about 350 psi).

In the reactor the gas phase typically comprises the monomers, a ballast gas such as nitrogen, possibly a molecular weight control agent such as hydrogen, and depending on the process possibly a condensable liquid (i.e. condensing mode such as disclosed in U.S. Pat. Nos. 4,543,399 issued Sep. 24, 1985 to Jenkins III et al.; 4,588,790 issued May 15, 1986 to Jenkins III et al.; and the so-called super condensing mode as disclosed in U.S. Pat. No. 5,352,749 issued Oct. 4, 1994 to DeChellis et al., assigned to Exxon Chemical Patents, Inc.; and U.S. Pat. No. 5,436,304 issued Jul. 25, 1995 to Griffen et al., assigned to Exxon Chemical Patents, Inc.).

The high density low molecular weight polymer may be prepared using a slurry polymerization process. Such processes are well known to those skilled in the art. In a slurry process the catalyst and co catalyst if required are suspended in an inert hydrocarbon medium, such as the hydrocarbon medium (diluent) described above with regard to impregnating the support with the catalyst, and the monomers and optionally a molecular weight control agent, typically hydrogen are dissolved in the inert hydrocarbon medium. The process may be a batch or continuous process conducted in a stirred autoclave or a loop reactor which have been suitably purged, typically with nitrogen and/or the diluent and dried. The catalyst and cocatalyst when employed may be charged to the reactor first or they can be charged simultaneously through an entry port under a diluent purge. After closing the entry port, hydrogen, if used, is added, and then additional diluent is added to the reactor. The reactor is heated to the desired reaction temperature, which for polymerizing ethylene and comonomers, for example, is typically within a range of about 50° C. to about 120° C. and the ethylene is then admitted to the reactor and maintained at a partial pressure within a range of about 0.5 MPa to about 5.0 MPa (70-725 psig). For batch operations at the end of the designated reaction period, the polymerization reaction is terminated and the unreacted monomer(s) and are vented. The reactor is opened and the polymer, such as polyethylene in diluent (if it does not evaporate readily) collected and the polymer is separated as a free-flowing white solid and is dried to obtain the product. In a continuous process, for example, a suitable reactor such as a loop reactor is continuously charged with suitable quantities of solvent or diluent, catalyst, cocatalyst, polymerizable compounds and hydrogen if any and in any desirable order. The reactor product is continuously withdrawn and the polymer recovered as appropriate, generally by flashing the diluent (solvent) and unreacted monomers and drying the resulting polymer.

The high density low molecular weight polymer may be produced in a solution process which are conducted in an inert solvent typically a lower ($C_{5-10}$) alkyl solvent such as pentane, hexane, cyclohexane and similar solvents including ISOPAR®E a solvent sold by Exxon. The reaction temperatures are generally higher than slurry processes typically in the range from 180° C. to about 300° C., preferably from 180° C. to 250° C., most preferably from 180° C. to 230° C. The pressure of the reaction may be up to about 15,000 psig for the older higher pressure process typically in the range from about 2,500 psig to 5,000 psig, preferably from about 3,000 psig to 4,500 psig. The reaction may take place in one or more continuous stirred tank reactors (CSTR) and the solvent and residual monomer are flashed off and the resulting polymer is recovered and pellitized. Generally the polymer is subject to a devolatilization process.

Generally the low density high molecular weight polyethylene will have a density from 0.915 to 0.940, preferably from 0.922 to 0.935 g/cc and a melt flow rate (load 21.6 kg) from 0.05 to 5.0, preferably from 0.05 to 1 g/10 minutes. The low density high molecular weight polyethylene may have a weight average molecular a weight greater than 250,000, typically from 300,000 to 600,000 as determined by GPC. The low density high molecular weight polyethylene may have a polydispersity (Mw/Mn) less than about 5, typically from 2 to 5.

The low density high molecular weight polyethylene may be prepared in the presence of a single site catalyst.

Single site type catalysts typically comprising a transition metal, preferably a group 4 metal (e.g. Ti, Zr and Hf) and generally have two bulky ligands. In many of the well known single site catalysts typically one of the bulky ligands is a cyclopentadienyl-type ligand. These cyclopentadienyl-type ligands comprise a $C_{5-13}$ ligand containing a 5-member carbon ring having delocalized bonding within the ring and bound to the metal atom through covalent $\eta^5$ bonds which are unsubstituted or may be further substituted (sometimes referred to in a short form as Cp ligands). Cyclopentadienyl-type ligands include unsubstituted cyclopentadienyl, substituted cyclopentadienyl, unsubstituted indenyl, substituted indenyl, unsubstituted fluorenyl and substituted fluorenyl. An exemplary list of substituents for a cyclopentadienyl-type ligand includes the group consisting of $C_{1-10}$ hydrocarbyl radicals (including phenyl and benzyl radicals), which hydrocarbyl substituents are unsubstituted or further substituted by one or more substituents selected from the group consisting of a halogen atom, preferably a chlorine or fluorine atom and a $C_{1-4}$ alkyl radical; a $C_{1-8}$ alkoxy radical; a $C_{6-10}$ aryl or aryloxy radical; an amido radical which is unsubstituted or substituted by up to two $C_{1-8}$ alkyl radicals; a phosphido radical which is unsubstituted or substituted by up to two $C_{1-8}$ alkyl radicals; silyl radicals of the formula —Si—$(R)_3$ wherein each R is independently selected from the group consisting of hydrogen, a $C_{1-8}$ alkyl or alkoxy radical, and $C_{6-10}$ aryl or aryloxy radicals; and germanyl radicals of the formula Ge—$(R)_3$ wherein R is as defined directly above.

If there are two such bulky ligands (i.e. bis Cp) the catalysts are metallocene-type catalysts. The Cp ligand may be bridged to another Cp ligand by a silyl bridge or a short chain ($C_{1-4}$) alkyl radical. The Cp-type ligand may be bridged to an amido radical which may be further substituted by up to two additional substituents. Such bridged complexes are sometimes referred to as constrained geometry catalysts.

Broadly, the transition metal complex (or catalyst) suitable for use in the present invention has the formula:

$$(L)_n\text{-M-}(X)_p$$

wherein M is a transition metal preferably selected from Ti, Hf and Zr (as described below); L is a monoanionic ligand selected from the group consisting of a cyclopentadienyl-type ligand, a bulky heteroatom ligand (as described below) and a phosphinimine ligand (as described below); X is an activatable ligand which is most preferably a simple monoanionic ligand such as alkyl or a halide (as described below); n may be from 1 to 3, preferably 2 or 3; and p may be from 1 to 3, preferably 1 or 2, provided that the sum of n+p equals the valence state of M, and further provided that two L ligands may be bridged by a silyl radical or a $C_{1-4}$ alkyl radical. If one or more of the L ligands is a phosphinimine ligand the transition metal complex may be of the formula:

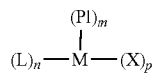

wherein M is a transition metal preferably selected from Ti, Hf and Zr (as described below); Pl is a phosphinimine ligand (as described below); L is a monoanionic ligand selected from the group consisting of a cyclopentadienyl-type ligand or a bulky heteroatom ligand (as described below); X is an activatable ligand which is most preferably a simple monoanionic ligand such as an alkyl or a halide (as described below); m is 1 or 2; n is 0 or 1; and p is an integer fixed by the valence of the metal M (i.e. the sum of m+n+p equals the valence state of M).

In one embodiment the catalysts are Group 4 metal complexes in the highest oxidation state. For example, the catalyst may be a bis (phosphinimine) dichloride complex of titanium, zirconium or hafnium. Alternately, the catalyst may contain one phosphinimine ligand, one "L" ligand (which is most preferably a cyclopentadienyl-type ligand) and two "X" ligands (which are preferably both chloride).

The preferred metals (M) are from Group 4, (especially titanium, hafnium or zirconium) with titanium being most preferred.

The catalyst may contain one or two phosphinimine ligands which are covalently bonded to the metal. The phosphinimine ligand is defined by the formula:

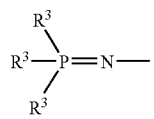

wherein each $R^3$ is independently selected from the group consisting of a hydrogen atom; a halogen atom; $C_{1-20}$, preferably $C_{1-10}$ hydrocarbyl radicals which are unsubstituted by or further substituted by a halogen atom; a $C_{1-8}$ alkoxy radical; a $C_{6-10}$ aryl or aryloxy radical; an amido radical; a silyl radical of the formula:

$$-\text{Si}-(R^2)_3$$

wherein each $R^2$ is independently selected from the group consisting of hydrogen, a $C_{1-8}$ alkyl or alkoxy radical, and $C_{6-10}$ aryl or aryloxy radicals; and a germanyl radical of the formula:

$$\text{Ge}-(R^2)_3$$

wherein $R^2$ is as defined above.

The preferred phosphinimines are those in which each $R^3$ is a hydrocarbyl radical, preferably a $C_{1-6}$ hydrocarbyl radical.

Preferred phosphinimine catalysts are Group 4 organometallic complexes which contain one phosphinimine ligand (as described above) and one ligand L which is either a cyclopentadienyl-type ligand or a heteroligand.

As used herein, the term "heteroligand" refers to a ligand which contains at least one heteroatom selected from the group consisting of boron, nitrogen, oxygen, phosphorus or sulfur. The heteroligand may be sigma or pi-bonded to the metal. Exemplary heteroligands include ketimide ligands, silicone-containing heteroligands, amido ligands, alkoxy ligands, boron hetrocyclic ligands and phosphole ligands, as all described below.

As used herein, the term "ketimide ligand" refers to a ligand which:

(a) is bonded to the transition metal via a metal-nitrogen atom bond;

(b) has a single substituent on the nitrogen atom (where this single substituent is a carbon atom which is doubly bonded to the N atom); and (c) has two substituents Sub 1 and Sub 2 (described below) which are bonded to the carbon atom.

Conditions a, b and c are illustrated below:

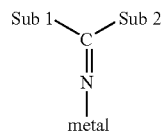

The substituents "Sub 1" and "Sub 2" may be the same or different. Exemplary substituents include hydrocarbyls having from 1 to 20 carbon atoms, silyl groups, amido groups and phosphido groups. For reasons of cost and convenience it is preferred that these substituents both be hydrocarbyl radicals, especially simple alkyl radicals (e.g. $C_{1-6}$, preferably $C_{1-4}$) and most preferably tertiary butyl.

Silicon containing heteroligands are defined by the formula:

$$-(\mu)\text{SiR}_x\text{R}_y\text{R}_z$$

wherein the — denotes a bond to the transition metal and p is sulfur or oxygen.

The substituents on the Si atom, namely $R_x$, $R_y$ and $R_z$ are required in order to satisfy the bonding orbital of the Si atom. The use of any particular substituent $R_x$, $R_y$ or $R_z$ is not especially important to the success of this invention. It is preferred that each of $R_x$, $R_y$ and $R_z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond and (b) the presence of two substituents (which are typically simple alkyl ($C_{1-6}$, preferably $C_{1-4}$) or silyl groups on the nitrogen atom.

The terms "alkoxy" and "aryloxy" is also intended to convey its conventional meaning. Thus, these ligands are characterized by (a) a metal oxygen bond and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are unsubstituted or further substituted by one or more $C_{1-4}$ alkyl radicals (e.g. 2,6 di-tertiary butyl phenoxy).

Boron heterocyclic ligands are characterized by the presence of a boron atom in a closed ring ligand. This definition includes heterocyclic ligands which also contain a nitrogen atom in the ring. These ligands are well known to those skilled in the art of olefin polymerization and are fully described in the literature (see, for example, U.S. Pat. Nos. 5,637,659; 5,554,775 and the references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116 (Sone, to Tosoh).

The term "activatable ligand" or "leaving ligand" refers to a ligand which may be activated by the aluminoxane (also referred to as an "activator") to facilitate olefin polymerization. Exemplary activatable ligands are independently selected from the group consisting of a hydrogen atom; a halogen atom, preferably a chlorine or fluorine atom; a $C_{1-10}$ hydrocarbyl radical, preferably a $C_{1-4}$ alkyl radical; a $C_{1-10}$ alkoxy radical, preferably a $C_{1-4}$ alkoxy radical; and a $C_{5-10}$ aryl oxide radical; each of which said hydrocarbyl, alkoxy, and aryl oxide radicals may be unsubstituted by or further substituted by one or more substituents selected from the group consisting of a halogen atom, preferably a chlorine or fluorine atom; a $C_{1-8}$ alkyl radical, preferably a $C_{1-4}$ alkyl radical; a $C_{1-8}$ alkoxy radical, preferably a $C_{1-4}$ alkoxy radical; a $C_{6-10}$ aryl or aryloxy radical; an amido radical which is unsubstituted or substituted by up to two $C_{1-8}$, preferably $C_{1-4}$ alkyl radicals; and a phosphido radical which is unsubstituted or substituted by up to two $C_{1-8}$, preferably $C_{1-4}$ alkyl radicals.

The number of activatable ligands depends upon the valency of the metal and the valency of the activatable ligand. The preferred catalyst metals are Group 4 metals in their highest oxidation state (i.e. 4+) and the preferred activatable ligands are monoanionic (such as a halide—especially chloride or $C_{1-4}$ alkyl—especially methyl). One useful group of catalysts contain a phosphinimine ligand, a cyclopentadienyl ligand and two chloride (or methyl) ligands bonded to the Group 4 metal. In some instances, the metal of the catalyst component may not be in the highest oxidation state. For example, a titanium (III) component would contain only one activatable ligand.

As noted above, one group of catalysts is a Group 4 organometallic complex in its highest oxidation state having a phosphinimine ligand, a cyclopentadienyl-type ligand and two activatable ligands. These requirements may be concisely described using the following formula for the preferred catalyst:

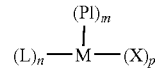

wherein M is a metal selected from Ti, Hf and Zr; Pl is as defined above, but preferably a phosphinimine wherein $R^3$ is a $C_{1-6}$ alkyl radical, most preferably a t-butyl radical; L is a ligand selected from the group consisting of cyclopentadienyl, indenyl and fluorenyl ligands which are unsubstituted or substituted by one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; X is selected from the group consisting of a chlorine atom and $C_{1-4}$ alkyl radicals; m is 1; n is 1; and p is 2.

In one embodiment of the present invention the transition metal complex may have the formula: $[(Cp)_qM[N=P(R^3)]_bX_c$ wherein M is the transition metal; Cp is a $C_{5-13}$ ligand containing a 5-membered carbon ring having delocalized bonding within the ring and bound to the metal atom through covalent $\eta^5$ bonds and said ligand being unsubstituted or up to fully substituted with one or more substituents selected from the group consisting of a halogen atom, preferably chlorine or fluorine; $C_{1-4}$ alkyl radicals; and benzyl and phenyl radicals which are unsubstituted or substituted by one or more halogen atoms, preferably fluorine; R is a substituent selected from the group consisting of $C_{1-10}$ straight chained or branched alkyl radicals, $C_{6-10}$ aryl and aryloxy radicals which are unsubstituted or may be substituted by up to three $C_{1-4}$ alkyl radicals, and silyl radicals of the formula —Si—$(R)_3$ wherein R is $C_{1-4}$ alkyl radical or a phenyl radical; L is selected from the group consisting of a leaving ligand; q is 1 or 2; b is 1 or 2; and the valence of the transition metal–(q+b)=c.

The catalyst components described above are used in combination with at least one cocatalyst (or "activator") to form an active catalyst system for olefin polymerization. Suitable activators include alumoxanes and ionic activators which are described in more detail below.

The activator may be selected from the group consisting of aluminoxane activators and ionic activators.

The alumoxane activator may be of the formula:

wherein each $R^4$ is independently selected from the group consisting of $C_{1-20}$ hydrocarbyl radicals and m is from 0 to 50, preferably $R^4$ is a $C_{1-4}$ alkyl radical and m is from 5 to 30. Methylalumoxane (or "MAO") in which each R is a methyl is a preferred alumoxane.

Alumoxanes are well known as cocatalysts, particularly for metallocene-type catalysts. Alumoxanes are also readily available articles of commerce.

The use of an alumoxane cocatalyst generally requires a molar ratio of aluminum to the transition metal in the catalyst from 20:1 to 1000:1. Preferred ratios are from 50:1 to 250:1.

So-called "ionic activators" are also well known for metallocene catalysts as described in U.S. Pat. No. 5,198,401 (Hlatky and Turner) and U.S. Pat. No. 5,132,380 (Stevens and Neithamer). Preferred ionic activators are boron-containing ionic activators as described below.

The boron activator may be selected from the group of boron compounds consisting of:

(i) compounds of the formula $[R^5]^+ [B(R^7)_4]^-$ wherein B is a boron atom, $R^5$ is an aromatic hydrocarbyl (e.g. triphenyl methyl) cation and each $R^7$ is independently selected from the group consisting of phenyl radicals which are unsubstituted or substituted with from 3 to 5 substituents selected from the group consisting of a fluorine atom; a $C_{1-4}$ alkyl or alkoxy radical which is unsubstituted or substituted by a fluorine atom; and a silyl radical of the formula —Si—$(R^9)_3$ wherein each $R^9$ is independently selected from the group consisting of a hydrogen atom and a $C_{1-4}$ alkyl radical; and (ii) compounds of the formula $[(R^8)_tZH]^+[B(R^7)_4]^-$ wherein B is a boron atom, H is a hydrogen atom, Z is a nitrogen atom or phosphorus atom, t is 2 or 3, $R^8$ is selected from the group consisting of $C_{1-8}$ alkyl radicals; a phenyl radical which is unsubstituted or substituted by up to three $C_{1-4}$ alkyl radicals; or one $R^8$ taken together with the nitrogen atom may form an anilinium radical, and $R^7$ is as defined above; and (iii) compounds of the formula $B(R^7)_3$ wherein $R^7$ is as defined above.

In the above compounds, preferably $R^7$ is a pentafluorophenyl radical, $R^5$ is a triphenylmethyl cation, Z is a nitrogen atom and $R^8$ is a $C_{1-4}$ alkyl radical or $R^8$ taken together with the nitrogen atom forms an anilinium radical which is substituted by two $C_{1-4}$ alkyl radicals.

The "ionic activator" may abstract one or more activatable ligands so as to ionize the catalyst center into a cation but not to covalently bond with the catalyst; and to provide sufficient distance between the catalyst and the ionizing activator permitting a polymerizable olefin to enter the resulting active site.

Examples of ionic activators include:
triethylammonium tetra(phenyl)boron,
tripropylammonium tetra(phenyl)boron,
tri(n-butyl)ammonium tetra(phenyl)boron,
trimethylammonium tetra(p-tolyl)boron,
trimethylammonium tetra(o-tolyl)boron,
tributylammonium tetra(pentafluorophenyl)boron,
tripropylammonium tetra(o,p-dimethylphenyl)boron,
tributylammonium tetra(m,m-dimethylphenyl)boron,
tributylammonium tetra(p-trifluoromethylphenyl)boron,
tributylammonium tetra(pentafluorophenyl)boron,
tri(n-butyl)ammonium tetra(o-tolyl)boron,
N,N-dimethylanilinium tetra(phenyl)boron,
N,N-diethylanilinium tetra(phenyl)boron,
N,N-diethylanilinium tetra(phenyl)n-butylboron,
N,N-2,4,6-pentamethylanilinium tetra(phenyl)boron,
di-(isopropyl)ammonium tetra(pentafluorophenyl)boron,
dicyclohexylammonium tetra(phenyl)boron,
triphenylphosphonium tetra(phenyl)boron,
tri(methylphenyl)phosphonium tetra(phenyl)boron,
tri(dimethylphenyl)phosphonium tetra(phenyl)boron,
tropillium tetrakispentafluorophenyl borate,
triphenylmethylium tetrakispentafluorophenyl borate,
benzene(diazonium)tetrakispentafluorophenyl borate,
tropillium phenyltrispentafluorophenyl borate,
triphenylmethylium phenyltrispentafluorophenyl borate,
benzene(diazonium)phenyltrispentafluorophenyl borate,
tropillium tetrakis(2,3,5,6-tetrafluorophenyl)borate,
triphenylmethylium tetrakis(2,3,5,6-tetrafluorophenyl)borate,
benzene(diazonium)tetrakis(3,4,5-trifluorophenyl)borate,
tropillium tetrakis(3,4,5-trifluorophenyl)borate,
benzene(diazonium)tetrakis(3,4,5-trifluorophenyl)borate,
tropillium tetrakis(1,2,2-trifluoroethenyl)borate,
triphenylmethylium tetrakis(1,2,2-trifluoroethenyl)borate,
benzene(diazonium)tetrakis(1,2,2-trifluoroethenyl)borate,
tropillium tetrakis(2,3,4,5-tetrafluorophenyl)borate,
triphenylmethylium tetrakis(2,3,4,5-tetrafluorophenyl)borate, and
benzene(diazonium)tetrakis(2,3,4,5-tetrafluorophenyl)borate.

Readily commercially available ionic activators include:
N,N-dimethylaniliniumtetrakispentafluorophenyl borate,
triphenylmethylium tetrakispentafluorophenyl borate, and
trispentafluorophenyl borane.

The above activators may be used with small amounts of aluminum scavengers of the formula $R_aAlX_b$ where R is a $C_{1-8}$, preferably $C_{1-4}$ alkyl or alkoxy radical and X is a halogen and a+b=3. Suitable aluminum alkyl activators include trimethyl aluminum (TMA), diethyl aluminum chloride (DEAC), ethyl aluminum dichloride, and the like. Typically, the scavenger is added at the beginning of the reaction and additional scavenger is not required or is metered into the reactor over the duration of the polymerization.

If the activator is an aluminum alkyl of the same formula as the scavenger the ratio of Al:Transition metal is 5-200:1, preferably 10-40:1.

If the Group 4 metal complex is activated with a combination of an alkylating agent (other than aluminoxane e.g. aluminum alkyl) and a compound capable of ionizing the Group 4 metal complex, then the molar ratios of Group 4 metal; metal in the alkylating agent (e.g. typically aluminum); metalloid (i.e. boron or phosphorus) in the activator capable of ionizing the Group 4 metal complex (e.g. boron) may range from 1:1:1 to 1:10:5. Preferably, the alkylating activator is premixed/reacted with the Group 4 metal complex and the resulting alkylated species is then reacted with the activator capable of ionizing the Group 4 metal complex.

The polymerization of the low density high molecular weight polyethylene in accordance with the present invention may be conducted in a liquid phase as either a slurry or solution polymerization conducted in an inert diluent or solvent, or a gas phase polymerization. The difference between slurry and solution polymerization being whether the resulting polymer is soluble in the liquid phase.

For gas phase and slurry polymerizations the catalyst should be supported on a support as described above.

The polymerization may be conducted at temperatures from about 20° C. to about 250° C. Depending on the product being made, this temperature may be relatively low such as from 20° C. to about 180° C., typically from about 80° C. to 150° C. and the polymer is insoluble in the liquid hydrocarbon phase (diluent) (e.g. a slurry polymerization). The reaction temperature may be relatively higher from about 180° C. to 250° C., preferably from about 180° C. to 230° C. and the polymer is soluble in the liquid hydrocarbon phase (solvent). The pressure of the reaction may be as high as about 15,000 psig for the older high pressure processes or may range from about 15 to 4,500 psig The components of the blend may be blended in a number of manners. The resins could be dry blended in for example a tumble blender and the blend per se used in the manufacturing process or fed through an extruder to form new pellets of the blend. The individual components could be fed directly to an extruder having for example a satellite feed. The extruders are operated at temperatures above the melting temperature of the polyethylene and with a sufficient shear rate to thoroughly mix the molten resin before it passes through the extruder and is typically chopped into pellets.

The resin blend per se will have a density greater than 0.940 g/cm$^3$, preferably from 0.940 to 0.960 g/cm$^3$, most preferably from 0.945 to 0.955 g/cm$^3$. Desirably, the composite resin may have a density from 0.945 to 0.950 g/cm$^3$. The blend should have a melt flow rate (21.6 kg) determined in accordance with ASTM D 1238 under a load of 21.6 kg and at a temperature of 190° C. of at least 5.0 g/10 minutes, typically 6.0 to 12.0 g/10 minutes, preferably from 7.0 to 10.0 g/10 minutes. The blend should have a polydispersity greater than 6.0, preferably greater than 10.0, most preferably greater than 12.0, desirably greater than 15.0.

The resulting blend may typically be compounded either by the manufacturer or the converter (e.g. the company converting the resin pellets into the final pipe). The blend may contain fillers, pigments and other additives. Typically the fillers are inert additives such as clay, talc, TiO$_2$ and calcium carbonate which may be added to the polyolefin in amounts of up to about 50 weight %, preferably less than 30 weight %. The blend may contain typical amounts of antioxidants and heat and light stabilizers such as combinations of hindered phenols and one or more of phosphates, phosphites and phosphonites typically in amounts of less than 0.5 weight % based on the weight of the blend. Pigments such as carbon black may also be added to the blend in small amounts.

In the manufacture of pipe and other products, the polyethylene resin blend may contain a nucleating agent in amounts from about 1,500 to about 10,000 parts per million (ppm) based on the weight of the polyolefin. Preferably the nucleating agent is used in amounts from 2,000 to 8,000 ppm, most preferably from 2,000 to 5,000 ppm based on the weight of the polyolefin.

The nucleating agent may be selected from the group consisting of dibenzylidene sorbitol, di(p-methyl benzylidene) sorbitol, di(o-methyl benzylidene)sorbitol, di(p-ethylbenzylidene)sorbitol, bis(3,4-dimethyl benzylidene)sorbitol, bis (3,4-diethylbenzylidene)sorbitol and bis trimethylbenzylidene)sorbitol. One commercially available nucleating agent is bis(3,4-dimethyl benzylidene)sorbitol.

The polyethylene blend and the components for the pipe may be dry blended and then passed through an extruder, most preferably a high shear mixing extruder having an annular die and a mandrel to extrude the polyethylene into a pipe. Generally, the extruder will be operated at a temperature from about 200 to 280° C., preferably from about 210 to 230° C. Preferably the pipe will pipe having a hydrostatic design basis at 23° C. of equal or greater than 1600 psi when tested according to ASTM D 2837, and minimum required strength (MRS) of 10 MPa at 20° C. when tested according to ISO 9080 Standard.

The blend per se (e.g. pellets formed from the blend) should have a density (e.g. the density of the blend in aggregate and not an individual components) greater than 0.940 g/cm$^3$, preferably from 0.940 to 0.960 g/cm$^3$, most preferably from 0.945 to 0.955 g/cm$^3$. Desirably, the resin blend may have a density from 0.945 to 0.950 g/cm$^3$. The resin blend will have a melt flow rate determined in accordance with ASTM D 1238 under a load of 21.6 kg and at a temperature of 190° C. of at least 5.0 g/10 minutes, typically 6.0 to 12.0 g/10 minutes, preferably from 7.0 to 10.0 g/10 minutes. The resin blend should have a polydispersity greater than 6.0, typically greater than 10.0, preferably greater than 12.0.

The present invention will now be illustrated by the following non limiting examples.

EXAMPLES

Preparation of polyethylene using a single site catalyst. A single site phosphinimine catalyst as described above in which the transition metal was Ti, the CP substituent was indenyl the activatable ligand was halide and the phosphinimine was a tri t-butyl phosphinimine. The catalyst was activated with aluminoxane and the polymerization was a gas phase polymerization of an ethylene hexene resin. The reaction was conducted under typical gas phase conditions in a stirred bed reactor similar to that disclosed in the examples of EP 0 659 773 B1.

Two different resins were prepared.

| NOVA Chemicals Single Site Catalyst High MW Components | | |
|---|---|---|
| | Resin A | Resin B |
| I2 | too low to measure | too low to measure |
| I5 | too low to measure | 0.032 and lower |
| I21 | <0.1 | 0.42 |
| MFR(I21/I2) | NA | NA |
| MFR(I21/I5) | NA | 18 |
| Density | 0.9234 | 0.9239 |
| Molecular weight | | |
| Mn × 1000 | 169.2 | 99 to 118 |
| Mw × 1000 | 502.2 | 252 to 285 |
| Mz × 1000 | 1002 | 500 to 558 |
| Polydispersity | 3 | 2.4 to 2.63 |
| Comonomer | Hexene | Hexene |
| Comonomer wt % | 2.4 | 1.1 to 2.2 |
| Branch freq./1000 C. | 2.1 | 1.9 to 3.7 |

Note:
Resin B covers a range of many batches of resin.

Two commercially available high density low molecular weight resins were acquired. The properties of the resins are summarized in the following table.

| Low MW Component | | |
|---|---|---|
| | SCLAIR 2909 | DOW DMDC 6400 NT7 |
| I2 | 12.6 | 0.72 |
| I5 | 36.3 | 2.96 |
| I21 | 314 | 53.7 |
| MFR(I21/I2) | 25 | 74.5 |
| MFR(I21/I5) | 8.7 | 18.1 |
| density | 0.9614 | 0.9618 |
| Molecular weight | | |
| Mn × 1000 | 18.5 | 15.2 |
| Mw × 1000 | 55.3 | 107.6 |
| Mz × 1000 | 151.8 | 635 |
| Polydispersity | 3 | 7.08 |
| Comonomer | Homopolymer | Homopolymer |
| Comonomer wt % | <0.3 | None |
| Branch freq./1000 C. | <0.5 | None |

The SCLAIR resins were made with a Ziegler Natta type catalyst in a solution polymerization process. Dow DMDC 6400 NT7 resin is believed to have been made using a chrome oxide based catalyst in a gas phase reaction.

Experiment 1

A melt blend of 50 weight % of resin A and 50 weight % of SCLAIR resin 2909 was made. A melt blend of 43 weight % of resin B and 57 weight % of the Dow resin DMDC 6400 NT7 was prepared. The physical properties of the blend and the PENT test (ASTM F1473-01) were conducted on the blend. The results of the tests are set forth in Table 1 below.

TABLE 1

| | Melt Blends | |
|---|---|---|
| Weight % | 50% Resin A | 43% Resin B |
| Weight % | 50% SCLAIR 2909 | 57% DOW Resin |
| I2 | 0.019 | too low to measure |
| I5 | 0.14 | 0.21 |
| I21 | 4.5 | 3.47 |
| MFR (I21/I2) | 236 | NA |
| MFR (I21/I5) | 32.1 | 16.9 |
| Density | 0.9454 | 0.945 |
| Molecular Weight | | |
| Mn × 1000 | 33.7 | 27.1 |
| Mw × 1000 | 263.8 | 176.8 |
| Mz × 1000 | 857 | 550.4 |
| Polydispersity | 7.8 | 6.52 |
| Comonomer | Hexene | Hexene |
| Comonomer wt % | 0.6 | 0.9 |
| Branch freq./1000 C. | 1.1 | 1.5 |
| Tensile at Yield, MPa | 22.6 | 23.7 |
| PENT Test ASTM F1473-01 | 370 | 1201.6 |
| Charpy Impact Energy, ASTM F2231, mJ | 1.42 | not done |

Note:
a PENT test of 100 hours is currently considered as a minimum requirement in the gas pipe standard ASTM D 2513.

Based on the properties in Table 1 the blends would meet the current requirements of the manufacture of polyethylene pipe, and expected to have superior pipe properties to current unimodial pipe products.

What is claimed is:

1. A polyolefin blend comprising:
   (a) from 30 to 80 weight % of copolymer having a Mw from 30,000 to 75,000 as determined by GPO comprising from 85 to 99.95 weight % of ethylene and from 15 to 0.05 weight % of one or more $C_{4-8}$ alpha olefins having a density from 0.953 to 0.965 g/cm$^3$ and a melt flow rate (2.16 kg 190° C.) from 0.1 to 20.0 g/10 minutes, said copolymer being prepared in the presence of a silyl chromate catalyst of the formula $(R^{10})_3Si-O-CrO_2-O-Si(R^{10})_3$ wherein $R^{10}$ is selected from the group consisting of $C_{1-10}$ alkyl groups ; and
   (b) from 70 to 20 weight % of a high molecular weight copolymer comprising from 85 to 99.9 weight % of ethylene and from 15 to 0.1 weight % of one or more $C_{4-8}$ alpha olefins having a density from 0.922 to 0.935 g/cm$^3$, a melt flow rate (21.6 kg 190° C.) from 0.05 to 5.0 g/10 minutes, and a polydispersity from 2 to 5 said copolymer being prepared with a phosphinimine catalyst of the formula:

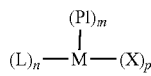

wherein M is selected from the group consisting of Ti, Hf and Zr; Pl is a phosphinimine ligand of the formula

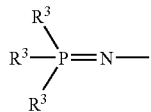

wherein $R^3$ is a $C_{1-6}$ alkyl radical, L is a ligand selected from the group consisting of cyclopentadienyl, indenyl and fluorenyl ligands which are unsubstituted or substituted by one or more substituents selected from the group consisting of a chlorine or fluorine atom, $C_{1-4}$ alkyl radicals, and benzyl and phenyl radicals which are unsubstituted or substituted by one or more halogen atoms. X is selected from the group consisting of a chlorine atom and $C_{1-4}$ alkyl radicals; m is 1; n is 1; and p is 2 and an activator.

2. The blend according to claim 1, wherein component (b) comprises from 85 to 99.9 weight % of ethylene and from 15 to 0.1 weight % of one or more $C_{4-8}$ alpha olefins.

3. The blend according to claim 2, wherein component (a) has a density of at least 0.955 g/cm$^3$.

4. The blend according to claim 3, wherein component (a) has a melt flow rate (2.16 kg 190° C.) from 0.5 to 10 g/10 minutes.

5. The blend according to claim 4, wherein component (b) has a melt flow rate (21.6 kg 190° C.) from 0.05 to 1 g/10 minutes.

6. The blend according to claim 5, wherein component (a) is present in an amount from 40 to 70 weight % of the blend and component (b) is present in an amount from 60 to 30 weight % of the blend.

7. The blend according to claim 6, wherein the blend per se has a density from 0.945 g/cm$^3$ to 0.955 g/cm$^3$ and a melt flow rate (21.6 kg 190° C.) of at least 5 g/10 minutes.

8. A polyolefin pipe having a hydrostatic design basis at 23° C. of equal or greater than 1,600 psi when tested according to ASTM D 2837; and minimum required strength (MRS) of 10 MPa at 20° C. when tested according to ISO 9080 prepared from a polyolefin blend according to claim 1.

* * * * *